US011250871B2

(12) United States Patent
Saito et al.

(10) Patent No.: US 11,250,871 B2
(45) Date of Patent: Feb. 15, 2022

(54) ACOUSTIC SIGNAL SEPARATION DEVICE AND ACOUSTIC SIGNAL SEPARATING METHOD

(71) Applicant: MITSUBISHI ELECTRIC CORPORATION, Tokyo (JP)

(72) Inventors: Tatsuhiko Saito, Tokyo (JP); Keigo Kawashima, Tokyo (JP); Jun Ishii, Tokyo (JP); Yohei Okato, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 113 days.

(21) Appl. No.: 16/769,459

(22) PCT Filed: Jan. 15, 2018

(86) PCT No.: PCT/JP2018/000803
§ 371 (c)(1),
(2) Date: Jun. 3, 2020

(87) PCT Pub. No.: WO2019/138573
PCT Pub. Date: Jul. 18, 2019

(65) Prior Publication Data
US 2021/0193163 A1    Jun. 24, 2021

(51) Int. Cl.
*G10L 15/00* (2013.01)
*G10L 21/028* (2013.01)
*G10L 15/02* (2006.01)
*G10L 15/16* (2006.01)
*G10L 15/22* (2006.01)
*G10L 25/30* (2013.01)
*G10L 19/00* (2013.01)

(52) U.S. Cl.
CPC ............ *G10L 21/028* (2013.01); *G10L 15/02* (2013.01); *G10L 15/16* (2013.01); *G10L 15/22* (2013.01); *G10L 25/30* (2013.01); *G10L 19/00* (2013.01)

(58) Field of Classification Search
CPC combination set(s) only.
See application file for complete search history.

(56) References Cited

U.S. PATENT DOCUMENTS

2017/0011741 A1    1/2017  Hershey et al.

FOREIGN PATENT DOCUMENTS

JP        2008-278433 A    11/2008
WO    WO 2017/007035 A1    1/2017

OTHER PUBLICATIONS

Kai et al., "Speech Detection from Extraction and Recognition of Lip Area", IPSJ SIG Technical Report, May 19, 2011, vol. 2011-CVIM-177, No. 13, pp. 1-8.
Sadaoki Furui, "Speech Information Processing", Morikita Publishing Co., Ltd., 1998, pp. 79-132.

*Primary Examiner* — Vu B Hang
(74) *Attorney, Agent, or Firm* — Birch, Stewart, Kolasch & Birch, LLP

(57) ABSTRACT

In an acoustic signal separation device (1), a determination unit (6) determines whether or not components from a plurality of sound sources are mixed in each of acoustic signals of respective components regenerated by a signal regeneration unit (5), and when it is determined that a plurality of components is mixed, a series of processes by a feature value extraction unit (2), a data estimation unit (3), a data classification unit (4), and a signal regeneration unit (5) is repeatedly executed until acoustic signals of the components of the respective sound sources are regenerated.

4 Claims, 6 Drawing Sheets

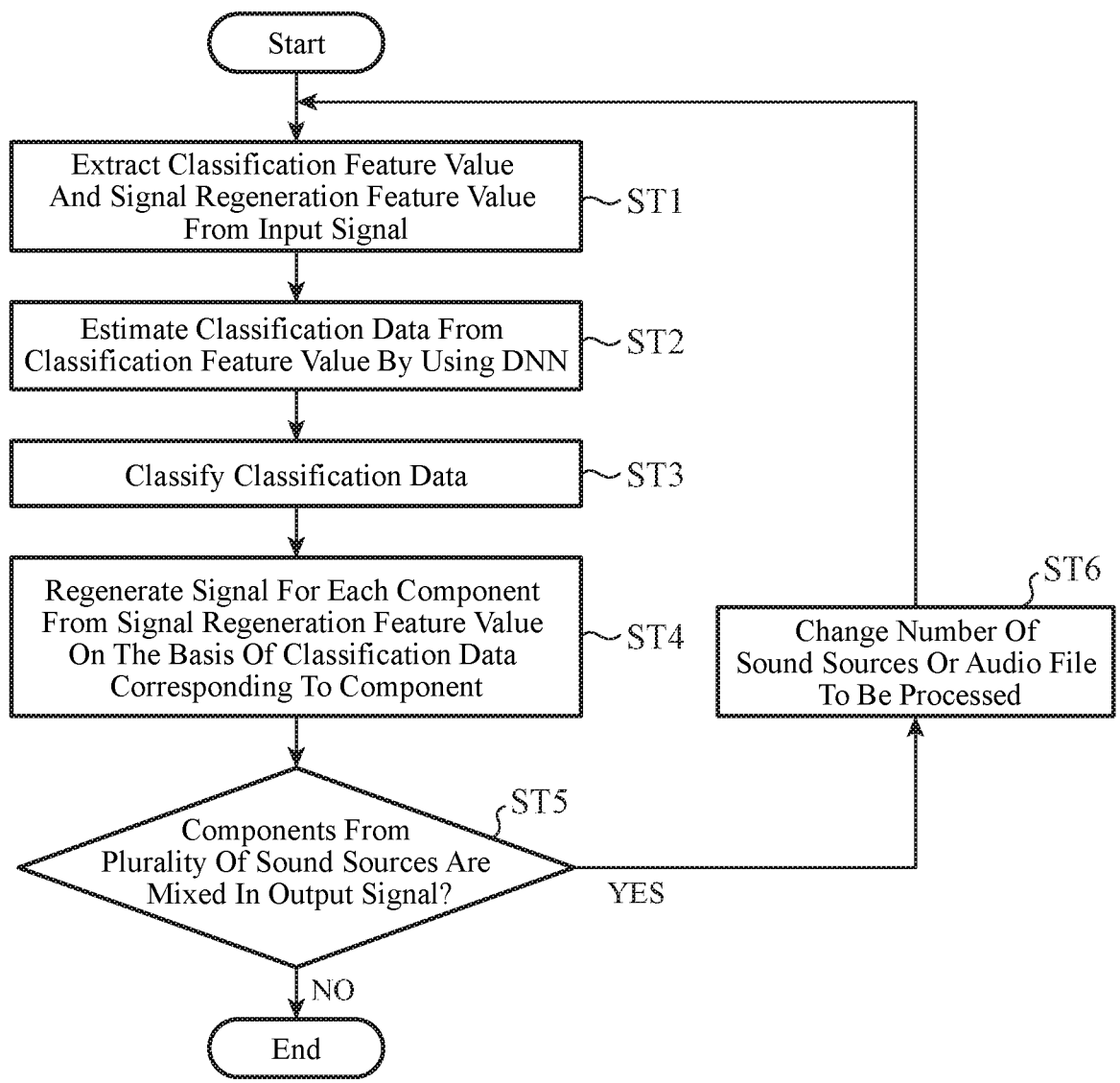

FIG. 4A
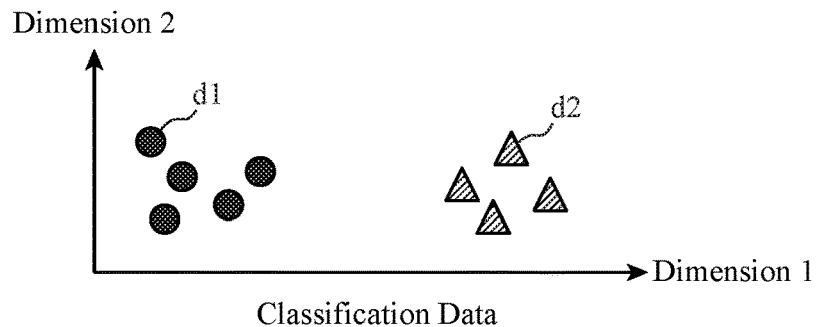
FIG. 4B
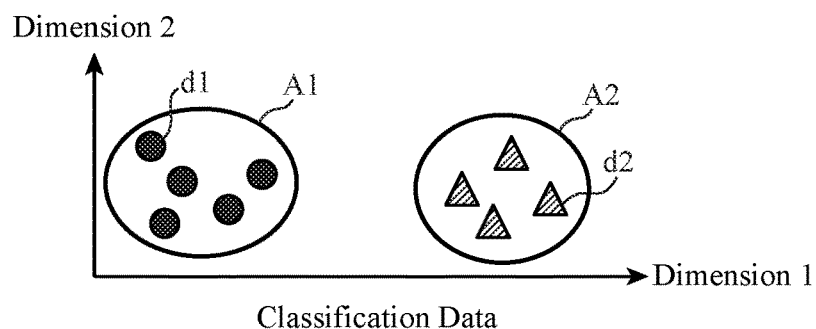
FIG. 5
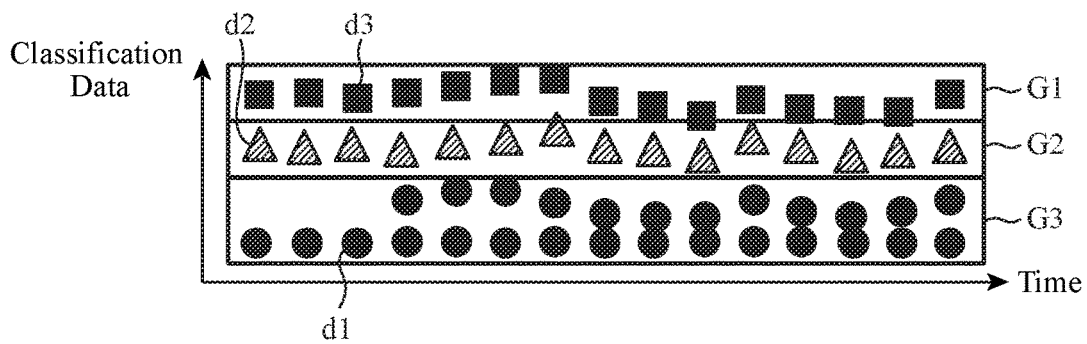
FIG. 6
| Input Signal | Speech Recognition Result | |
|---|---|---|
| Signal Generated From Classification Result G1 | Ohayo (Good Morning) | 10a |
| Signal Generated From Classification Result G2 | Konnichiwa (Good Afternoon) | 10b |
| Signal Generated From Classification Result G3 | Konbanwa (Good Evening) | 10c |

FIG. 7A
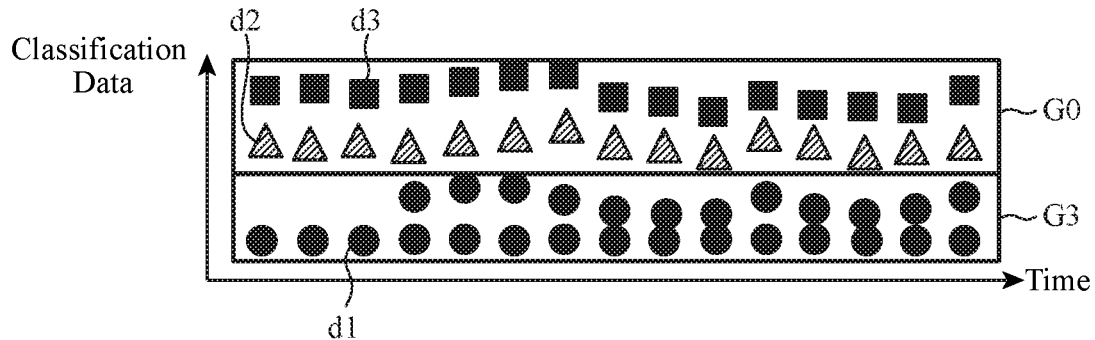
FIG. 7B
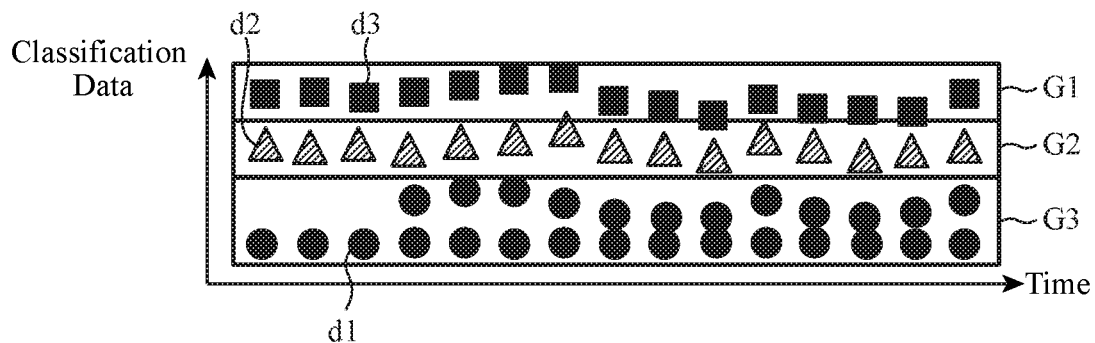
FIG. 8
| Input Signal | Speech Recognition Result | |
|---|---|---|
| Signal Generated From Classification Result G0 | (No Recognition Result) | |
| Signal Generated From Classification Result G1 | Ohayo (Good Morning) | 10a |
| Signal Generated From Classification Result G2 | Konnichiwa (Good Afternoon) | 10b |
| Signal Generated From Classification Result G3 | Konbanwa (Good Evening) | 10c |

FIG. 9

| Input Signal | Speech Recognition Result | Recognition Likelihood |
|---|---|---|
| Signal Generated From Classification Result G0 | Konnyaku (Konjac) | 0.1 |
| Signal Generated From Classification Result G1 | Ohayo (Good Morning) | 0.9 |
| Signal Generated From Classification Result G2 | Konnichiwa (Good Afternoon) | 0.8 |
| Signal Generated From Classification Result G3 | Konbanwa (Good Evening) | 1.0 |

ACOUSTIC SIGNAL SEPARATION DEVICE AND ACOUSTIC SIGNAL SEPARATING METHOD

TECHNICAL FIELD

The present invention relates to an acoustic signal separation device and an acoustic signal separating method for separating an acoustic signal in which components from one or more sound sources are mixed, into acoustic signals of the respective components.

BACKGROUND ART

As a technique for separating an acoustic signal in which components from one or more sound sources are mixed, into acoustic signals of the respective components, there is a method described in Patent Literature 1, for example. In this method, an acoustic signal in which one or more components are mixed is separated into acoustic signals of the respective components by using a deep neural network (hereinafter, referred to as DNN).

CITATION LIST

Patent Literature

Patent Literature 1: WO 2017/007035 A

SUMMARY OF INVENTION

Technical Problem

Since the method described in Patent Literature 1 cannot confirm whether the acoustic signal is appropriately separated into components of respective sound sources after separating the acoustic signal, there has been a problem that there is a case where the acoustic signal is not correctly separated into components of respective sound sources if the number of sound sources is unknown.

The present invention has been made to solve the above problem, and aims to provide an acoustic signal separation device and an acoustic signal separating method that can appropriately separate an acoustic signal into components of respective sound sources even when the number of sound sources is unknown.

Solution to Problem

An acoustic signal separation device according to the present invention includes processing circuitry. The processing circuitry extracts a feature value from an input signal including an acoustic signal in which one or more components are mixed. The processing circuitry estimates classification data on the basis of the feature value extracted, by using a DNN trained to estimate the classification data for association between components of at least one acoustic signal output from an identical sound source. The processing circuitry classifies the classification data estimated into pieces of data corresponding to acoustic signals of respective components. The processing circuitry regenerates the acoustic signals of the respective components, on a basis of both the classification data classified for each of the components of the acoustic signals and the feature value extracted. The processing circuitry determines whether or not components from a plurality of sound sources are mixed in each of the acoustic signals of the respective components regenerated. In this configuration, when it is determined that the components from the plurality of sound sources are mixed, a series of processes of the extracting, the estimating, the classifying, and the regenerating by the processing circuitry is repeatedly executed until acoustic signals of the components of the respective sound sources are regenerated.

Advantageous Effects of Invention

According to the present invention, the acoustic signal separation device determines whether or not components from a plurality of sound sources are mixed in each of the acoustic signals of the respective components regenerated, and when it is determined that a plurality of components is mixed, repeatedly executes a series of processes of the extracting, the estimating, the classifying, and the regenerating by the processing circuitry until acoustic signals of components of respective sound sources are regenerated.

With this configuration, the acoustic signal separation device can appropriately separate the acoustic signal into components of respective sound sources even when the number of sound sources is unknown.

BRIEF DESCRIPTION OF DRAWINGS

FIG. 3 is a flowchart illustrating an acoustic signal separating method according to the first embodiment.

FIG. 4A is a diagram illustrating pieces of classification data corresponding to two types of components of at least one acoustic signal, mapped in a two-dimensional space. FIG. 4B is a diagram illustrating the pieces of classification data classified into each of the components of the acoustic signal, mapped in a two-dimensional space.

FIG. 5 is a diagram illustrating a relationship between classification results of pieces of classification data corresponding to components from three sound sources and time.

FIG. 6 is a diagram illustrating examples of speech recognition results of acoustic signals of respective components.

FIG. 7A illustrates a relationship between a classification result of classification data corresponding to an acoustic signal in which components from two sound sources are mixed and a classification result of classification data corresponding to an acoustic signal of a component from one sound source, and time. FIG. 7B is a diagram illustrating a relationship between classification results of classification data corresponding to acoustic signals correctly separated into components from respective three sound sources, and time.

FIG. 8 is a diagram illustrating a speech recognition result for each of an acoustic signal in which components from a plurality of sound sources are mixed and an acoustic signal of a component output from one sound source.

FIG. 9 is a diagram illustrating a speech recognition result and a recognition likelihood for each of an acoustic signal in which components from a plurality of sound sources are mixed and an acoustic signal of a component from one sound source.

DESCRIPTION OF EMBODIMENTS

Hereinafter, to explain the present invention in more detail, embodiments for carrying out the present invention will be described with reference to the accompanying drawings.

First Embodiment

Figure 1:
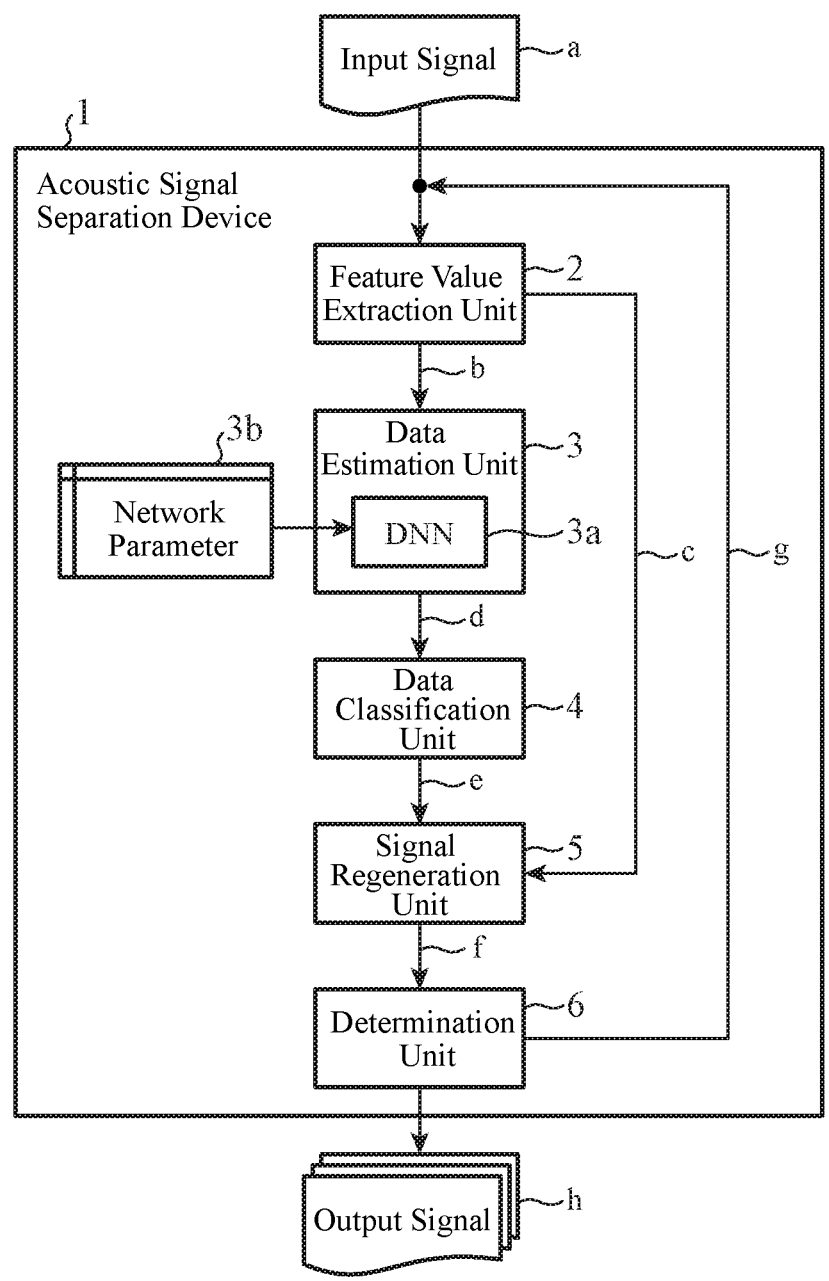
FIG. 1 is a block diagram illustrating a configuration of an acoustic signal separation device according to a first embodiment of the present invention.

FIG. 1 is a block diagram illustrating a configuration of an acoustic signal separation device 1 according to a first embodiment of the present invention. The acoustic signal separation device 1 includes a feature value extraction unit 2, a data estimation unit 3, a data classification unit 4, a signal regeneration unit 5, and a determination unit 6, and separates an acoustic signal included in an input signal a into acoustic signals of respective components, and outputs output signals h including the acoustic signals of the respective components.

The feature value extraction unit 2 extracts feature values from the input signal a. The input signal a may be an acoustic signal in which one or more components are mixed, or may be a signal including an acoustic signal and another signal. For example, the input signal a may be a signal including, in addition to an acoustic signal, an image signal or text data associated with the acoustic signal.

The feature values extracted from the input signal a by the feature value extraction unit 2 are a classification feature value b and a signal regeneration feature value c. The classification feature value b is a feature value used for estimation of classification data d by the data estimation unit 3. For example, the feature value extraction unit 2 performs a short-time Fourier transform on the acoustic signal included in the input signal a to obtain amplitude on the frequency axis, and calculates a feature value on the basis of the amplitude on the frequency axis. Data obtained by arranging the feature values calculated from the acoustic signal in this way in time series may be used as the classification feature value b.

The signal regeneration feature value c is a feature value used for generation of an output signal f by the signal regeneration unit 5. For example, the signal regeneration feature value c may be a spectral coefficient calculated in the feature value extraction unit 2 by performing a short-time Fourier transform on the acoustic signal included in the input signal a, or may include image information or text data included in the input signal a.

The data estimation unit 3 estimates the classification data d by using a DNN 3a, on the basis of the classification feature value b extracted from the input signal a by the feature value extraction unit 2. The classification data d is data for association between components of at least one acoustic signal output from the same sound source.

For example, the classification data d may be a cost between components of an acoustic signal converted so that a distance between time-frequency components of the at least one acoustic signal output from the same sound source is short.

In the DNN 3a, a network parameter 3b is set that has been learned in advance to estimate the classification data d on the basis of the classification feature value b. The DNN 3a in which the network parameter 3b is set estimates the classification data d by performing an operation hierarchically on the classification feature value b. For example, a Recurrent Neural Network (RNN) or a Convolutional Neural Network (CNN) may be used as the DNN 3a.

The data classification unit 4 classifies the classification data d estimated by the data estimation unit 3 for each component from the sound source. The classification data d may be classified by using a classification method such as k-means clustering or Gaussian Mixture Models (GMM). Classification result information e which is the classification data d classified by the data classification unit 4 is output to the signal regeneration unit 5.

The signal regeneration unit 5 receives the classification result information e from the data classification unit 4, and regenerates acoustic signals of respective components from the signal regeneration feature value c on the basis of the classification data d for each component in the classification result information e. The signal regeneration unit 5 outputs the output signal f including the acoustic signals of the respective components regenerated, to the determination unit 6. Note that, the output signal f may include image signals and text information corresponding to the acoustic signals of the respective components regenerated.

The determination unit 6 determines whether or not components from a plurality of sound sources are mixed in each of the acoustic signals of the respective components included in the output signal f of the signal regeneration unit 5. For example, the determination unit 6 determines whether or not components from a plurality of sound sources are mixed in each of the acoustic signals of the respective component included in the output signal f, on the basis of a speech recognition result of each of the acoustic signals of the respective components. Furthermore, the determination unit 6 may determine whether or not components from a plurality of sound sources are mixed in each of the acoustic signals of the respective component included in the output signal f, on the basis of a recognition likelihood of the speech recognition result of each of the acoustic signals of the respective components.

The determination unit 6 returns an output signal g including an acoustic signal determined to be an acoustic signal in which components from a plurality of sound sources are mixed, to the feature value extraction unit 2. As a result, a series of processes by the feature value extraction unit 2, the data estimation unit 3, the data classification unit 4, and the signal regeneration unit 5 is repeatedly executed until acoustic signals of components of respective sound sources are regenerated appropriately. The determination unit 6 outputs the output signals h. The output signals h are signals including the acoustic signals of the components of the respective sound sources regenerated by the signal regeneration unit 5, and may include image signals and text information corresponding to these acoustic signals.

Figure 2A:
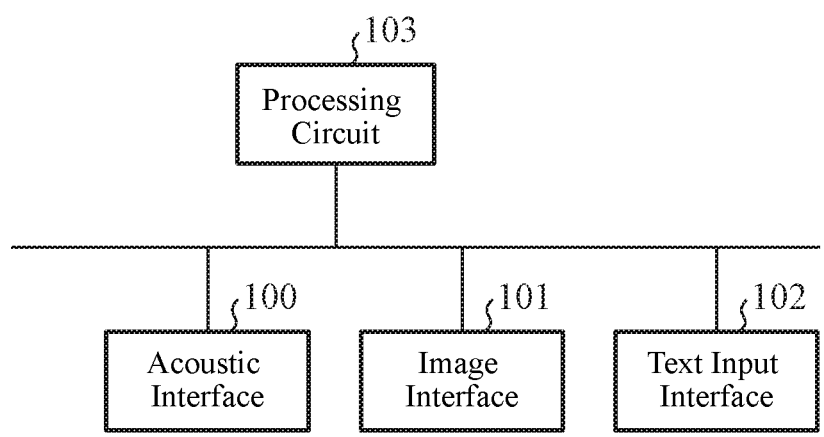
FIG. 2A is a block diagram illustrating a hardware configuration for implementing a function of the acoustic signal separation device according to the first embodiment.
Figure 2B:
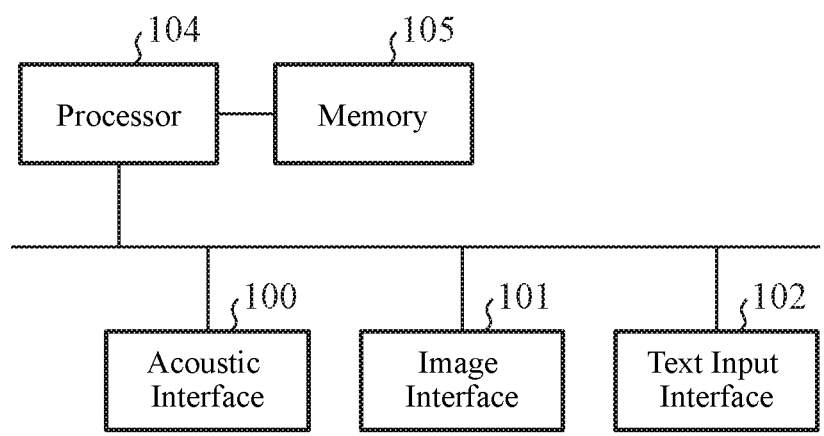
FIG. 2B is a block diagram illustrating a hardware configuration for executing software for implementing the function of the acoustic signal separation device according to the first embodiment.

FIG. 2A is a block diagram illustrating a hardware configuration for implementing a function of the acoustic signal separation device 1. FIG. 2B is a block diagram illustrating a hardware configuration for executing software for implementing the function of the acoustic signal separation device 1. In FIGS. 2A and 2B, an acoustic interface 100 is an interface for inputting an acoustic signal included in the input signal a, and outputting acoustic signals included in the output signals h. For example, the acoustic interface 100 is connected to a microphone for collecting acoustic signals, and is connected to a speaker for outputting acoustic signals.

An image interface 101 is an interface for inputting an image signal included in the input signal a, and outputting an image signal included in the output signals h. For example, the image interface 101 is connected to a camera for capturing an image signal, and is connected to a display for displaying the image signal.

A text input interface 102 is an interface for inputting text information included in the input signal a, and outputting text information included in the output signals h. For example, the text input interface 102 is connected to a keyboard or mouse for inputting text information, and is connected to a display for displaying the text information.

A memory (not illustrated) included in a processing circuit 103 illustrated in FIG. 2A, or a memory 105 illustrated in FIG. 2B temporarily stores the input signal a, the classification feature value b, the signal regeneration feature value c, the classification data d, the classification result information e, the output signal f, the output signal g, and the output signals h.

The processing circuit 103 or a processor 104 reads these pieces of data from the memory as necessary and performs separation processing on the acoustic signal.

Functions of the feature value extraction unit 2, the data estimation unit 3, the data classification unit 4, the signal regeneration unit 5, and the determination unit 6 in the acoustic signal separation device 1 are implemented by a processing circuit.

That is, the acoustic signal separation device 1 includes a processing circuit for executing processes from step ST1 to step ST5 described later with reference to FIG. 3. The processing circuit may be dedicated hardware, or a central processing unit (CPU) for executing a program stored in a memory.

When the processing circuit is the processing circuit 103 of the dedicated hardware illustrated in FIG. 2A, examples of the processing circuit 103 include a single circuit, a composite circuit, a programmed processor, a parallel-programmed processor, an application specific integrated circuit (ASIC), a field-programmable gate array (FPGA), and a combination thereof. The functions of the feature value extraction unit 2, the data estimation unit 3, the data classification unit 4, the signal regeneration unit 5, and the determination unit 6 may be implemented by separate processing circuits, or these functions may be collectively implemented by one processing circuit.

When the processing circuit is the processor 104 illustrated in FIG. 2B, the functions of the feature value extraction unit 2, the data estimation unit 3, the data classification unit 4, the signal regeneration unit 5, and the determination unit 6 are implemented by software, firmware, or a combination of software and firmware. The software or the firmware is described as a program and stored in the memory 105.

The processor 104 reads and executes the program stored in the memory 105, thereby implementing the functions of the feature value extraction unit 2, the data estimation unit 3, the data classification unit 4, the signal regeneration unit 5, and the determination unit 6. That is, the acoustic signal separation device 1 includes the memory 105 for storing one or more programs which, when executed by the processor 104, perform the processes from step ST1 to step ST5 illustrated in FIG. 3 resultantly.

These programs cause a computer to execute procedures or methods of the feature value extraction unit 2, the data estimation unit 3, the data classification unit 4, the signal regeneration unit 5, and the determination unit 6.

The memory 105 may be a computer-readable storage medium storing a program for causing a computer to function as the feature value extraction unit 2, the data estimation unit 3, the data classification unit 4, the signal regeneration unit 5, and the determination unit 6.

Examples of the memory 105 include a nonvolatile or volatile semiconductor memory such as a random access memory (RAM), a read only memory (ROM), flash memory, erasable programmable read only memory (EPROM), or electrically-EPROM (EEPROM), a magnetic disk, a flexible disk, an optical disk, a compact disk, a mini disk, a DVD, and the like. Furthermore, the memory 105 may be an external memory such as a Universal Serial Bus (USB) memory.

Some of the functions of the feature value extraction unit 2, the data estimation unit 3, the data classification unit 4, the signal regeneration unit 5, and the determination unit 6 may be implemented by dedicated hardware, and some of the functions may be implemented by software or firmware. For example, the functions of the feature value extraction unit 2 and the data estimation unit 3 are implemented by a processing circuit that is dedicated hardware. For the data classification unit 4, the signal regeneration unit 5, and the determination unit 6, the processor 104 may implement the functions thereof by reading and executing the program stored in the memory 105. As described above, the processing circuit can implement each of the above-described functions by the hardware, software, firmware, or a combination thereof.

Next, the operation will be described.

FIG. 3 is a flowchart illustrating an acoustic signal separating method according to the first embodiment.

The feature value extraction unit 2 extracts the classification feature value b and the signal regeneration feature value c from the input signal a (step ST1). The classification feature value b is output from the feature value extraction unit 2 to the data estimation unit 3, and the signal regeneration feature value c is output from the feature value extraction unit 2 to the signal regeneration unit 5.

The input signal a may include an image signal input by the image interface 101 or text information input by the text input interface 102, in addition to the acoustic signal whose input is accepted by the acoustic interface 100.

Furthermore, the feature value extraction unit 2 may read the input signal a from the memory (not illustrated) included in the processing circuit 103, or the memory 105, and extract a feature value.

Moreover, the input signal a may be stream data.

Next, the data estimation unit 3 estimates the classification data d on the basis of the classification feature value b by using the DNN 3$a$ (step ST2). The classification data d is output from the data estimation unit 3 to the data classification unit 4.

Subsequently, the data classification unit 4 classifies the classification data d estimated by the data estimation unit 3 for each component on the basis of the number of sound sources specified in advance (step ST3). The data classification unit 4 outputs the classification result information e which is the classification data d classified for each component, to the signal regeneration unit 5.

FIG. 4A is a diagram illustrating pieces of classification data d1 and d2 corresponding to two types of components of at least one acoustic signal, mapped in a two-dimensional space. FIG. 4B is a diagram illustrating the pieces of classification data d1 and d2 classified for each of the components of the acoustic signal, mapped in a two-dimensional space. In the example of FIG. 4A, the number of sound sources is two, a sound source A and a sound source B, and it is assumed that a component of an acoustic signal output from the sound source A and a component of an acoustic signal output from the sound source B are mixed in the input signal a.

The classification data d1 indicated by a circular symbol is data for association between components of the acoustic signal output from the sound source A, and the classification data d2 indicated by a triangle symbol is data for association between components of the acoustic signal output from the sound source B.

For example, when an output state of the acoustic signal from the sound source changes, the classification feature value b changes accordingly. When the data estimation unit 3 estimates the classification data d on the basis of the classification feature value b by using the DNN 3a, even in the case of the classification data d corresponding to the components of the at least one acoustic signal output from the same sound source, values of the classification data d may vary depending on the change of the classification feature value b. For this reason, input is performed to the data classification unit 4 in a state in which it is not known whether the classification data d dispersed in a plurality of values is the classification data d1 belonging to the sound source A or the classification data d2 belonging to the sound source B.

FIG. 4B is a diagram illustrating the classification data d1 and d2 classified for each of the components from the sound sources, in FIGS. 4A and 4B, the number of sound sources is two, the sound source A and the sound source B.

When the classification data d is input from the data estimation unit 3, the data classification unit 4 classifies the classification data d on the basis of "2" that is the number of sound sources specified in advance. As a result, a classification result A1 indicating the classification data d1 corresponding to the sound source A, and a classification result A2 indicating the classification data d2 corresponding to the sound source B are obtained.

FIG. 5 is a diagram illustrating a relationship between classification results of the pieces of classification data d1, d2, and d3 corresponding to components from respective three sound sources A, B, and C, and time. In FIG. 5, the classification data d3 indicated by a square symbol is classified into a classification result G1 corresponding to the sound source C, the Classification data d2 indicated by a triangle symbol is classified into a classification result G2 corresponding to the sound source B, and the classification data d1 indicated by a circular symbol is classified into a classification result G3 corresponding to the sound source A.

The description will be continued referring back to FIG. 3.

The signal regeneration unit 5 regenerates the acoustic signals of respective components, on the basis of both the signal regeneration feature value c input from the feature value extraction unit 2, and the classification data d for each of the components in the classification result information e input from the data classification unit 4 (step ST4). For example, the signal regeneration unit 5 identifies the signal regeneration feature value c corresponding to the sound source by using the classification data d classified into the same component, and regenerates the acoustic signals of the respective components on the basis of the signal regeneration feature value c identified and the classification data d. The signal regeneration unit 5 outputs the output signal f including the acoustic signals of the respective components regenerated, to the determination unit 6.

The determination unit 6 determines whether or not components from a plurality of sound sources are mixed in each of the acoustic signals of the respective components included in the output signal f of the signal regeneration unit 5 (step ST5). For example, the determination unit 6 determines whether or not components from a plurality of sound sources are mixed in an acoustic signal on the basis of a speech recognition result of the acoustic signal. A recognition technique such as so-called "pattern recognition" may be used for speech recognition processing. The determination unit 6 determines that an acoustic signal for which the speech recognition result is obtained has only a component from one sound source, and an acoustic signal for which the speech recognition result is not obtained is an acoustic signal in which components from a plurality of sound sources are mixed.

For example, the determination unit 6 executes the speech recognition processing on an acoustic signal included in the output signal f from the signal regeneration unit 5. Furthermore, the determination unit 6 may execute the speech recognition processing on the acoustic signal by using a DNN provided separately from the DNN 3a.

FIG. 6 is a diagram illustrating examples of the speech recognition results of the acoustic signals of respective components, and illustrates speech recognition results for the acoustic signals of respective components regenerated by using the classification results G1 to G3 in FIG. 5. In FIG. 6, a "signal generated from classification result G1" is an acoustic signal of a component from the sound source C, regenerated on the basis of the classification data d3 of the classification result G1 by the signal regeneration unit 5. A "signal generated from classification result G2" is an acoustic signal of a component from the sound source B, regenerated on the basis of the classification data d2 of the classification result G2 by the signal regeneration unit 5. A "signal generated from classification result G3" is an acoustic signal of a component from the sound source A, regenerated on the basis of the classification data d1 of the classification result G3 by the signal regeneration unit 5.

The speech recognition processing can be performed with high accuracy on an acoustic signal appropriately separated for each of components from the respective sound sources. By performing speech recognition on the acoustic signal regenerated on the basis of the classification data d3 of the classification result G1, a speech recognition result 10a is obtained. By performing speech recognition on the acoustic signal regenerated on the basis of the classification result G2, a speech recognition result 10b is obtained. By performing speech recognition on the regenerated acoustic signal on the basis of the classification result G3, a speech recognition result 10c is obtained.

When the speech recognition result of the acoustic signal is obtained, the determination unit 6 determines that components from a plurality of sound sources are not mixed in the acoustic signal and cannot be separated into more components (step ST5; NO), and outputs the output signals h including the acoustic signal to the outside, and ends the process.

FIG. 7A illustrates a relationship between a classification result G0 of classification data corresponding to an acoustic signal in which the component from the sound source B and the component from the sound source C are mixed and the classification result G3 of classification data corresponding to the acoustic signal of the component from the sound source A, and time. FIG. 7B is a diagram illustrating a relationship between classification results G1, G2, and G3 of classification data corresponding to acoustic signals correctly separated into respective components from the sound source A, sound source B, and sound source C, and time. FIGS. 7A and 7B illustrate a case where an acoustic signal in which components from the sound sources A, B, and C are mixed is separated into the components of the respective sound sources.

When the acoustic signal in which components from the respective sound sources A, B, and C are mixed is separated into the components of the respective sound sources, the data classification unit 4 is required to perform classification into each of the classification data d1 corresponding to the component from the sound source A, the classification data d2 corresponding to the component from the sound source B, and the classification data d3 corresponding to the component from the sound source C.

However, in FIG. 7A, the number of sound sources is unknown, and the data classification unit 4 classifies the classification data d on the basis of "2" that is the number of sound sources specified advance. For this reason, for example, the classification data d1 is correctly classified into the classification result G3 corresponding to the sound source A, but the classification data d2 and the classification data d3 are incorrectly classified into the classification result G0 corresponding to an acoustic signal in which the component from the sound source B and the component from the sound source C are mixed.

FIG. 8 is a diagram illustrating a speech recognition result for each of the acoustic signal in which the component from the sound source B and the component from the sound source C are mixed, and the acoustic signal of the component from the sound source A. In FIG. 8, a signal generated from classification result G0" is an acoustic signal that is regenerated on the basis of the pieces of classification data d2 and d3 of the classification result G0 by the signal regeneration unit 5 and in which the component from the sound source B and the component from the sound source C are mixed. The "signal generated from classification result G1" is an acoustic signal of the component from the sound source C, regenerated on the basis of the classification data d3 of the classification result G1. The "signal generated from classification result G2" is an acoustic signal of the component from the sound source B, regenerated on the basis of the classification data d2 of the classification result G2. The "signal generated from classification result G3" is an acoustic signal of the component from the sound source A, regenerated on the basis of the classification data d1 of the classification result G3.

The speech recognition result 10a is obtained by performing speech recognition on the acoustic signal of the component from the sound source C. The speech recognition result 10b is obtained by performing speech recognition on the acoustic signal of the component from the sound source B, and the speech recognition result 10c is obtained by performing speech recognition on the acoustic signal of the component from the sound source A.

However, accuracy of speech recognition is low in the acoustic signal in which the component from the sound source B and the component from the sound source C are mixed, and thus a recognition result cannot be obtained as illustrated in FIG. 8.

When the speech recognition result of the acoustic signal is not obtained, the determination unit 6 determines that components from a plurality of sound sources are mixed in the acoustic signal (step ST5; YES). At this time, the number of sound sources specified in the data classification unit 4 or an audio file to be processed is changed (step ST6). For example, the data classification unit 4 increases the number of sound sources specified in advance by +1. Thereafter, the determination unit 6 outputs the output signal g including both the component of the above-described acoustic signal, and the component of the acoustic signal regenerated together with the component of the above-described acoustic signal, to the feature value extraction unit 2, and the process returns to step ST1. Furthermore, when the audio file to be processed is changed, the determination unit 6 outputs only the acoustic signal in which components from a plurality of sound sources are mixed to the feature value extraction unit 2 and the process returns to step ST1.

Thereafter, the feature value extraction unit, the data estimation unit 3, the data classification unit 4, and the signal regeneration unit 5 execute a series of processes from step ST1 to step ST4 on the acoustic signal until the acoustic signal is appropriately separated into acoustic signals of components of respective sound sources.

When the series of processes from step ST1 to step ST4 is repeatedly executed, the data classification unit 4 classifies the classification data d1 into the classification result G3 corresponding to the sound source A, the classification data d2 into the classification result G2 corresponding to the sound source B, and the classification data d3 into the classification result G1 corresponding to the sound source C, as illustrated in FIG. 7B. On the basis of the classification result G1, the classification result G2, and the classification result G3, the signal regeneration unit 5 regenerates an acoustic signal of the component from the sound source C, an acoustic signal of the component from the sound source B, and an acoustic signal of the component from the sound source A.

As described above, the acoustic signal separation device 1 determines whether or not components from a plurality of sound sources are mixed in each of the acoustic signals of the respective components regenerated, and repeatedly performs component separation processing until an acoustic signal determined to be an acoustic signal in which components from a plurality of sound sources are mixed is appropriately separated into the components of the respective sound sources. As a result, even when the number of sound sources is unknown, the acoustic signal can be appropriately separated into components of the respective sound sources.

Note that, the speech recognition processing is not limited to pattern recognition, and may adopt, for example, speech recognition processing other than pattern recognition as described in a reference.

(Reference) Sadaoki Furui, "Speech Information Processing", Morikita Publishing, 1998, pp. 79-132

Furthermore, on the basis of a recognition likelihood of a speech recognition result of a target acoustic signal, the determination unit 6 may determine whether or not components from a plurality of sound sources are mixed therein.

FIG. 9 is a diagram illustrating a speech recognition result and a recognition likelihood for each of an acoustic signal in which components from a plurality of sound sources are mixed and an acoustic signal of a component from one sound source. Up to here, it has been assumed that speech recognition cannot be performed on an acoustic signal in which components from a plurality of sound sources are mixed; however, in practice, although recognition accuracy is low, a recognition result may be obtained.

In FIG. 9, the "signal generated from classification result G0" is the acoustic signal that is regenerated on the basis of the pieces of classification data d2 and d3 of the classification result G0 by the signal regeneration unit 5 and in which the component from the sound source B and the component from the sound source C are mixed. The "signal generated from classification result G1" is the acoustic signal of the component from the sound source C, regenerated on the basis of the classification data d3 of the classification result G1. The "signal generated from classification result G2" is the acoustic signal of the component from the sound source B, regenerated on the basis of the classification illustration data d2 of the classification result G2. The "signal generated from classification result G3" is the acoustic signal of the component from the sound source A, regenerated on the basis of the classification data d1 of the classification result G3.

The speech recognition result 10a is obtained by performing speech recognition on the acoustic signal of the component from the sound source C, and the recognition likelihood is "0.9". The speech recognition result 10b is obtained by performing speech recognition on the acoustic signal of the component from the sound source B, and the recognition likelihood is "0.8". The speech recognition result 10c is obtained by performing speech recognition on the acoustic signal of the component from the sound source A, and the recognition likelihood is "1.0". On the other hand, a singular speech recognition result 10d is obtained by performing speech recognition on the acoustic signal in which the component from the sound source B and the component from the sound source C are mixed, and the recognition likelihood is "0.1".

The determination unit 6 compares the recognition likelihood of the speech recognition result of the target acoustic signal with a preset threshold value, and determines that components from a plurality of sound sources are not mixed in the acoustic signal if the recognition likelihood is higher than the threshold value, and determines that components from a plurality of sound sources are mixed in the acoustic signal if the recognition likelihood is less than or equal to the threshold value. For example, when the threshold value regarding the recognition likelihood is 0.5, the determination unit 6 determines that components from a plurality of sound sources are mixed in the "signal generated from classification result G0" having the recognition likelihood of less than or equal to 0.5.

For example, the determination unit 6 executes speech recognition processing and calculation of a recognition likelihood on an acoustic signal included in the output signal f from the signal regeneration unit 5. Furthermore, the determination unit 6 may execute the speech recognition processing and the calculation of the recognition likelihood on the acoustic signal by using a DNN provided separately from the DNN 3a.

Up to here, the case has been described where the series of processes from step ST1 to step ST4 illustrated in FIG. 3 is executed on the output signal g including the acoustic signal determined to be an acoustic signal in which components from a plurality of sound sources are mixed, and the component of the acoustic signal regenerated together with the component of the determined acoustic signal; however, this is not a limitation.

For example, when it is determined that components from a plurality of sound sources are mixed in the signal regenerated by the signal regeneration unit 5, the data classification unit 4 may change the number of sound sources specified in advance (for example, the number of sound sources set to "2" in FIGS. 4A and 4B), and the acoustic signal separation device 1 may separate the acoustic signal included in the input signal a into signals of the number of sound sources after the change.

Furthermore, the acoustic signal separation device 1 may perform the series of processes from step ST1 to step ST4 on the output signal g including only the component of the acoustic signal determined to be an acoustic signal in which components from a plurality of sound sources are mixed.

Also in these cases, when it is determined that components from a plurality of sound sources are mixed in the signal regenerated by the signal regeneration unit 5, the series of processes from step ST1 to step ST4 is repeated.

As described above, in the acoustic signal separation device 1 according to the first embodiment, the determination unit 6 determines whether or not components from a plurality of sound sources are mixed in each of the acoustic signals of the respective components regenerated. When it is determined that a plurality of components is mixed, the series of processes by the feature value extraction unit 2, the data estimation unit 3, the data classification unit 4, and the signal regeneration unit 5 is repeatedly executed until the acoustic signal is separated into acoustic signals of the components of the respective sound sources. In this configuration, the determination unit 6 determines whether or not components from a plurality of sound sources are mixed on the basis of the speech recognition result of each of the acoustic signals of the respective components. Alternatively, the determination unit 6 determines whether or not components from a plurality of sound sources are mixed on the basis of the recognition likelihood for the speech recognition on each of the acoustic signals of the respective components.

With such a configuration, the acoustic signal separation device 1 can appropriately separate the acoustic signal into components of respective sound sources even when the number of sound sources is unknown.

Note that, the present invention is not limited to the above-described embodiment, and within the scope of the present invention, any constituent element of the embodiment can be modified or any constituent element of the embodiment can be omitted.

INDUSTRIAL APPLICABILITY

The acoustic signal separation device according to the present invention can appropriately separate an acoustic signal into components of respective sound sources even when the number of sound sources is unknown, so that the acoustic signal separation device can be used for a conference system in which a plurality of sound sources exists, for example.

REFERENCE SIGNS LIST

1: acoustic signal separation device, 2: feature value extraction unit, 3: data estimation unit, 3a: DNN, 3b: network parameter, 4: data classification unit, 5: signal regeneration unit, 6: determination unit, 10a to 10d: speech recognition result, 100: acoustic interface, 101: image interface, 102: text input interface, 103: processing circuit; 104: processor, 105: memory

The invention claimed is:
1. An acoustic signal separation device comprising:
processing circuitry
to extract a feature value from an input signal including an acoustic signal in which one or more components are mixed;
to estimate classification data on a basis of the feature value extracted by using a deep neural network trained to estimate the classification data for association between components of at least one acoustic signal output from an identical sound source;
to classify the classification data estimated into pieces of data corresponding to acoustic signals of respective components;

to regenerate the acoustic signals of the respective components, on a basis of both the classification data classified for each of the components of the acoustic signals and the feature value extracted; and to determine whether or not components from a plurality of sound sources are mixed in each of the acoustic signals of the respective components regenerated, wherein when it is determined that the components from the plurality of sound sources are mixed, a series of processes of the extracting, the estimating, the classifying, and the regenerating by the processing circuitry is repeatedly executed until acoustic signals of the components of the respective sound sources are regenerated.

2. The acoustic signal separation device according to claim 1, wherein
the processing circuitry determines whether or not the components from the plurality of sound sources are mixed on a basis of a speech recognition result of each of the acoustic signals of the respective components.

3. The acoustic signal separation device according to claim 1, wherein
the processing circuitry determines whether or not the components from the plurality of sound sources are mixed on a basis of a recognition likelihood for speech recognition on each of the acoustic signals of the respective components.

4. An acoustic signal separating method comprising:

extracting a feature value from an input signal including an acoustic signal in which one or more components are mixed;

estimating classification data on a basis of the feature value extracted, by using a deep neural network trained to estimate the classification data for association between components of at least one acoustic signal output from an identical sound source;

classifying the classification data estimated into pieces of data corresponding to acoustic signals of respective components;

regenerating the acoustic signals of the respective components, on a basis of both the classification data classified for each of the components of the acoustic signals and the feature value extracted; and determining whether or not components from a plurality of sound sources are mixed in each of the acoustic signals of the respective components regenerated, wherein when it is determined that the components from the plurality of sound sources are mixed, a series of processes of the extracting, the estimating, the classifying, and the regenerating is repeatedly executed until acoustic signals of the components of the respective sound sources are regenerated.

\* \* \* \* \*